US010877771B2

(12) United States Patent
Tsirkin et al.

(10) Patent No.: US 10,877,771 B2
(45) Date of Patent: Dec. 29, 2020

(54) VIRTUAL MACHINE BOOTING USING DISK METADATA

(71) Applicant: Red Hat, Inc., Raleigh, NC (US)

(72) Inventors: Michael Tsirkin, Lexington, MA (US); Eduardo Pereira Habkost, Curitiba (BR)

(73) Assignee: Red Hat, Inc., Raleigh, NC (US)

( * ) Notice: Subject to any disclaimer, the term of this patent is extended or adjusted under 35 U.S.C. 154(b) by 83 days.

(21) Appl. No.: 16/200,517

(22) Filed: Nov. 26, 2018

(65) Prior Publication Data

US 2020/0167171 A1  May 28, 2020

(51) Int. Cl.
  *G06F 9/4401* (2018.01)
  *G06F 9/455* (2018.01)

(52) U.S. Cl.
  CPC .......... *G06F 9/4416* (2013.01); *G06F 9/4406* (2013.01); *G06F 9/45558* (2013.01); *G06F 2009/45575* (2013.01); *G06F 2009/45583* (2013.01); *G06F 2009/45595* (2013.01)

(58) Field of Classification Search
  CPC ...... G06F 9/4401; G06F 9/4406; G06F 9/441; G06F 9/4416; G06F 9/44505; G06F 9/44536; G06F 9/566; G06F 9/45558; G06F 2009/45562; G06F 2009/4557; G06F 2009/45575; G06F 2009/45583; G06F 2009/45591; G06F 2009/45595
  See application file for complete search history.

(56) References Cited

U.S. PATENT DOCUMENTS

| 8,458,717 | B1 |  | 6/2013 | Keagy et al. |
|---|---|---|---|---|
| 8,812,830 | B2 |  | 8/2014 | Raj et al. |
| 9,665,378 | B2 |  | 5/2017 | Warkentin et al. |
| 9,766,912 | B1 | * | 9/2017 | Jorgensen ................. G06F 9/48 |
| 10,019,252 | B1 |  | 7/2018 | Cui et al. |
| 10,379,894 | B1 | * | 8/2019 | Cruz Oliveira Queiros ................ G06F 21/52 |
| 2009/0204961 | A1 | * | 8/2009 | DeHaan .................... G06F 8/60 718/1 |
| 2009/0282404 | A1 | * | 11/2009 | Khandekar ......... G06F 9/45558 718/1 |

(Continued)

OTHER PUBLICATIONS

VMware, Inc., "vSphere Virtual Machine Administration," Update 1, Modified on May 4, 2018, VMware vSphere 6.0, VMware ESXi 6.0, vCenter Server 6.0, 289 pages.

(Continued)

*Primary Examiner* — Thomas J. Cleary
(74) *Attorney, Agent, or Firm* — Lowenstein Sandler LLP (57) ABSTRACT

A processing device receives a virtual machine boot request for booting a virtual machine, wherein the virtual machine boot request identifies a virtual disk image stored on a physical disk, and wherein the virtual machine boot request comprises a first value of a virtual machine parameter. The processing device accesses the virtual disk image, wherein the virtual disk image comprises disk parameter metadata. The processing device retrieves from the disk parameter metadata a second value of the virtual machine parameter. Responsive to determining that the second value of the virtual machine parameter does not match the first value of the virtual machine parameter, the processing device fails the virtual machine boot request.

20 Claims, 7 Drawing Sheets

(56) References Cited

U.S. PATENT DOCUMENTS

| | | | | |
|---|---|---|---|---|
| 2011/0093849 | A1* | 4/2011 | Chawla | H04L 41/0816 718/1 |
| 2012/0278802 | A1* | 11/2012 | Nilakantan | H04L 41/0886 718/1 |
| 2013/0132950 | A1* | 5/2013 | McLeod | G06F 9/45558 718/1 |
| 2014/0164598 | A1* | 6/2014 | Srinivasan | H04L 29/0872 709/224 |
| 2015/0039875 | A1* | 2/2015 | Di Cocco | G06F 8/63 713/2 |
| 2015/0234728 | A1* | 8/2015 | Coleman | G06F 11/0751 714/57 |
| 2015/0254103 | A1* | 9/2015 | Chandrasekaran | G06F 9/5011 718/1 |
| 2016/0070597 | A1* | 3/2016 | Riggin | G06F 9/5011 718/1 |
| 2017/0351861 | A1* | 12/2017 | El-Moussa | G06F 21/566 |
| 2018/0150306 | A1 | 5/2018 | Govindaraju et al. | |
| 2018/0217765 | A1 | 8/2018 | Hadas et al. | |
| 2019/0065233 | A1* | 2/2019 | Vishnoi | G06F 9/45558 |
| 2019/0258503 | A1* | 8/2019 | Manco | G06F 9/54 |
| 2019/0278928 | A1* | 9/2019 | Rungta | G06F 9/44505 |

OTHER PUBLICATIONS

Wikipedia, "Open Virtualization Format," https://en.wikipedia.org/wiki/Open_Virtualization_Format. Date of access Nov. 26, 2018.

* cited by examiner

VIRTUAL MACHINE BOOTING USING DISK METADATA

TECHNICAL FIELD

Embodiments of the present invention relate generally to virtual machines, and more specifically to methods of booting virtual machine from virtual disk images.

BACKGROUND

Data centers may include clusters consisting of multiple hosts (e.g., physical servers) in racks. Hypervisors may operate on each host to create and run virtual machines (VMs). VMs emulate computer systems and may be referred to as guest machines. The hosts in the clusters may be connected via one or more wired (e.g., Ethernet) and/or wireless (e.g., WiFi) networks (e.g., the Internet, local area network). Each VM running on the hypervisors may be booted from a virtual disk image with configuration that is compatible with the VM configuration. Virtual disk images may be stored on one or more physical disks connected to the host system either locally or via a network.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein are methods and systems for booting a virtual machine (VM) from virtual disk images. In order to boot a virtual machine, a virtual disk image may be supplied to the hypervisor along with the boot request. The hypervisor may then emulate a bootable disk with the supplied image. This process is susceptible to errors because certain virtual machine configuration parameters may be incompatible with the parameters of the host on which the virtual machine is requested to be instantiated, thus leading to partially working or non-functional virtual machine.

Aspects of the present disclosure address the above-noted and other deficiencies by providing systems and methods for booting virtual machines by repurposing the disk metadata area of the virtual disk image for storing the virtual machine configuration information. Certain physical disk formats include physical disk metadata for storing physical disk parameter values, such as the number of cylinders, the number of sectors per cylinder, etc. A virtual disk image may have a structure that mimics a physical disk format. Accordingly, the virtualization manager may utilize the metadata area of the virtual disk image for storing the values of one or more VM configuration parameters. The VM configuration parameters may include the type of central processing unit (CPU), the peripheral device type (such as a network interface controller or a display controller), the minimum available memory, etc.

In an illustrative example, the hypervisor may receive a VM boot request for booting a VM from a virtual disk image. The VM boot request may include one or more configuration parameter values (e.g., specified as <name=value> pairs). Before booting the VM, the hypervisor may compare, for each parameter specified by the VM boot request, the parameter value stored in the virtual disk image metadata area and the parameter value specified by the VM boot request. Should the parameter values match, the boot process may continue; otherwise, the boot process may fail and return an error code indicative of the reason for the failure. The error code may include an identifier of the parameter whose requested value does not match the value stored in the virtual disk image metadata area.

The parameter validation may involve comparing the two sets of configuration parameters to find out if the parameters specified by the request are compatible with the configuration parameters stored in the metadata area. In one embodiment, the compatibility may be found if each of the input parameter values exactly match the corresponding stored parameter value. In another embodiment, the compatibility may be found if each of the input parameter values is equal or exceeds the corresponding stored parameter value. In another embodiment, the compatibility may be found if each of the input parameter values is equal or less than the corresponding stored parameter value. For example, if the VM configuration parameter is CPU frequency and the input value is 2.6 GHz while the stored value is 3.4 GHz, the hypervisor may determine that there is a match between the input parameter value and the stored parameter value. In some instances, the stored configuration parameter value may represent the type of the central processing unit (CPU) of the VM, the type of a peripheral device (such as a network interface controller or a display controller), the minimum available memory, etc. If the hypervisor determines that the input parameters are incompatible with the configuration of the host system, the hypervisor may fail the boot request.

Subsequent to failing the boot request, the requestor (e.g., the virtualization manager) and/or the hypervisor may perform certain remedial operations based on the nature and degree of incompatibility. In one implementation, the virtualization manager may remove a reference to the virtual disk image from a list of boot devices for the VM, or may remove a reference to the virtual disk image from a list of virtual disk images accessible by the VM. In another implementation, the hypervisor may notify the requestor of incompatibility of the input parameter values with the configuration of the host system.

In another illustrative example, the hypervisor may receive a VM boot request for booting a VM from a virtual disk image that is stored on a physical disk. The hypervisor may access the virtual disk image parameter metadata and retrieve one or more stored VM configuration parameters and associated values. The hypervisor may parse the boot request to determine if the requestor has supplied any values for a configuration parameters stored in the virtual disk image metadata. If the requester had not provided a value for the VM configuration parameter, the hypervisor may utilize the VM configuration parameter value stored on the virtual disk image metadata to boot the VM. For instance, the hypervisor may initialize a shell environment variable by setting the value of the environment variable to the value of the VM configuration parameter. Alternatively, the hypervisor may insert the value of the VM configuration parameter into a device configuration file for initializing and setting up the device during the boot process. This method enables a more flexible VM boot operation because the hypervisor may configure certain aspects of the VM immediately before or during the boot process based on the data stored in the virtual disk image metadata area.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring embodiments of the present invention.

Various aspects of the above referenced methods and systems are described in details herein below are targeted at improving the functionality of the virtualization technology by improving the reliability of the boot process of virtual machines from virtual disk images.

Figure 1:
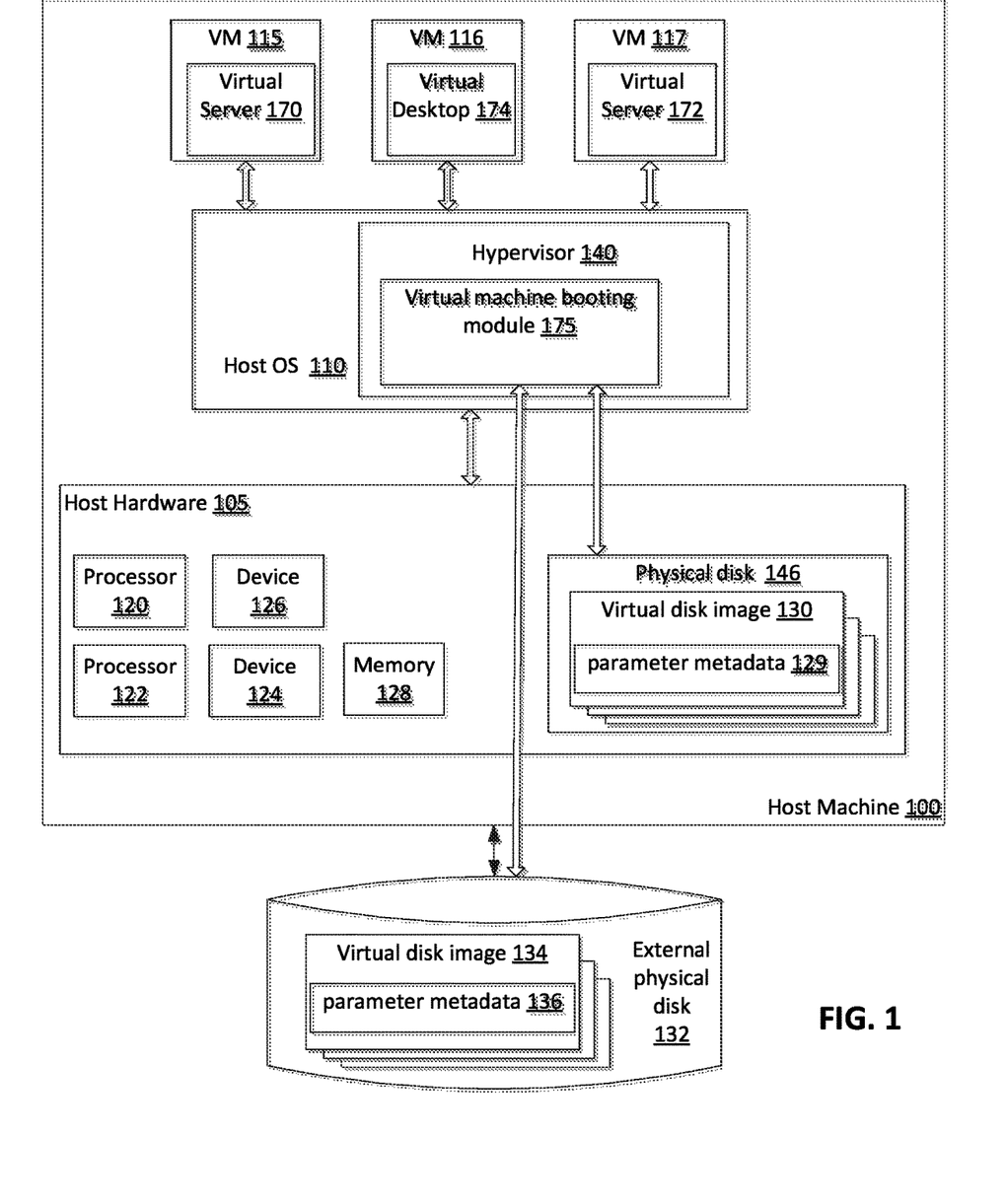
FIG. 1 is a block diagram of a computer system representing a host machine, in accordance with one implementation.

FIG. 1 is a block diagram that illustrates an embodiment of a computer system (referred to herein as a host machine 100) that hosts one or more virtual machines (VMs) 115-117. The host machine 100 may be a rackmount server, a workstation, a desktop computer, a notebook computer, a tablet computer, a mobile phone, a palm-sized computing device, a personal digital assistant (PDA), etc. The host machine 100 includes host hardware 105, which may include multiple processors 120, 122, multiple devices 124, 126, memory 128, and other hardware components. The memory 128 may include volatile memory devices (e.g., random access memory (RAM)), non-volatile memory devices (e.g., flash memory), and/or other types of memory devices. The host hardware 105 may also be coupled to external storage 132 via a direct connection or a network (not shown). The network may include a private network (e.g., a local area network (LAN), wide area network (WAN), intranet, etc.) and/or a public network (e.g., the Internet). The host machine 100 may be a single machine or multiple host machines arranged in a cluster.

Each of the devices 124, 126 may be a physical device that is internal or external to the host machine 100. Examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, etc. Examples of external devices include a keyboard, mouse, speaker, external hard drive (e.g., external storage 132), external I/O devices, etc.

The host machine 100 runs a hypervisor 140 (also referred to as a virtual machine monitor (VMM)). In one embodiment (as shown), hypervisor 140 is a component of a host operating system (OS) 110. Alternatively, the hypervisor 140 may run on top of a host OS 110, or may run directly on host hardware 105 without the use of a host OS 110.

The hypervisor 140 may manage system resources, including access to memory 128, devices 124, 126, secondary storage, and so on. Alternatively, hypervisor 140 may rely on the host OS 110 to manage the system resources. The hypervisor 140, though typically implemented in software, may emulate and export a bare machine interface (host hardware 105) to the higher level software. Such higher level software may comprise a standard or real-time operating system (OS), may be a highly stripped down operating environment with limited operating system functionality, may not include traditional OS facilities, etc. The hypervisor 140 presents to other software (i.e., "guest" software) the abstraction of one or more virtual machines (VMs) 115-117, which may provide the same or different abstractions to various guest software (e.g., guest operating system, guest applications, etc.).

The host machine 100 may host one or more virtual machines (VM) 115-117 (e.g., a single VM, one hundred VMs, etc.). A virtual machine 115-117 is a combination of guest software that uses an underlying emulation of host machine 100 (e.g., as provided by hypervisor 140). Each VM 115-117 may include one or multiple virtual components such as virtual processors, virtual memory, virtual devices (e.g., virtual storage), and so forth. Each of these virtual components may map to a hardware component, such as a processor 120, 122, device 124, 126, external storage 132, or memory 128. Virtual machines 115-117 can be, for example, hardware emulation, full virtualization, para-virtualization, and operating system-level virtualization virtual machines. The guest software that runs in a VM 115-117 may include a guest operating system, guest applications, guest device drivers, etc. The virtual machines 115-117 may have the same or different guest operating systems, such as Windows®, Linux®, Solaris®, etc.

Some virtual machines 115-117 may include guest software that is accessible by clients (e.g., local clients and/or remote clients) to provide services to those clients. For example, VMs 115, 117 include virtual servers 170, 172 such as a virtual web server, a virtual data storage server, a virtual gaming server, a virtual enterprise application server, etc. A client may connect to a virtual sever 170, 172 to request one or more services provided by the virtual server 170, 172.

Similarly, VM 116 includes a virtual desktop 174. A virtual desktop 174 is a virtualized desktop computer, and thus may include storage, an operating system, applications installed on the operating system (e.g., word processing applications, spreadsheet applications, email applications, etc.), and so on. However, rather than these functions being provided and performed at a client, they are instead provided and performed by a virtual machine 116. A virtual desktop can represent an output (e.g., an image to be displayed) generated by a desktop application running within a virtual machine. Graphics data associated with the virtual desktop can be captured and transmitted to a client, where the virtual desktop may be rendered by a rendering agent and presented by a client application.

In one embodiment, the hypervisor 140 may include a VM boot module 175. The VM boot module 175 may retrieve, from the disk parameter metadata 129 of the virtual disk image 130, stored VM configuration parameters and their respective values to be utilized for booting the VM from the virtual disk image 130. Virtual disk image 130 may be stored on local physical disk 146 or external physical disk 132, which may be accessible via one or more networks. For example, the VM boot module 175 may access the virtual disk parameter metadata 136 to retrieve the type of central processing unit (CPU) that is stored in the disk parameter metadata area. In one embodiment, physical disks 146 and 132 may store one or more virtual disk images 130 and 134 respectively. In another embodiment, a single virtual disk image may be stored on one or more physical disks.

Figure 2:
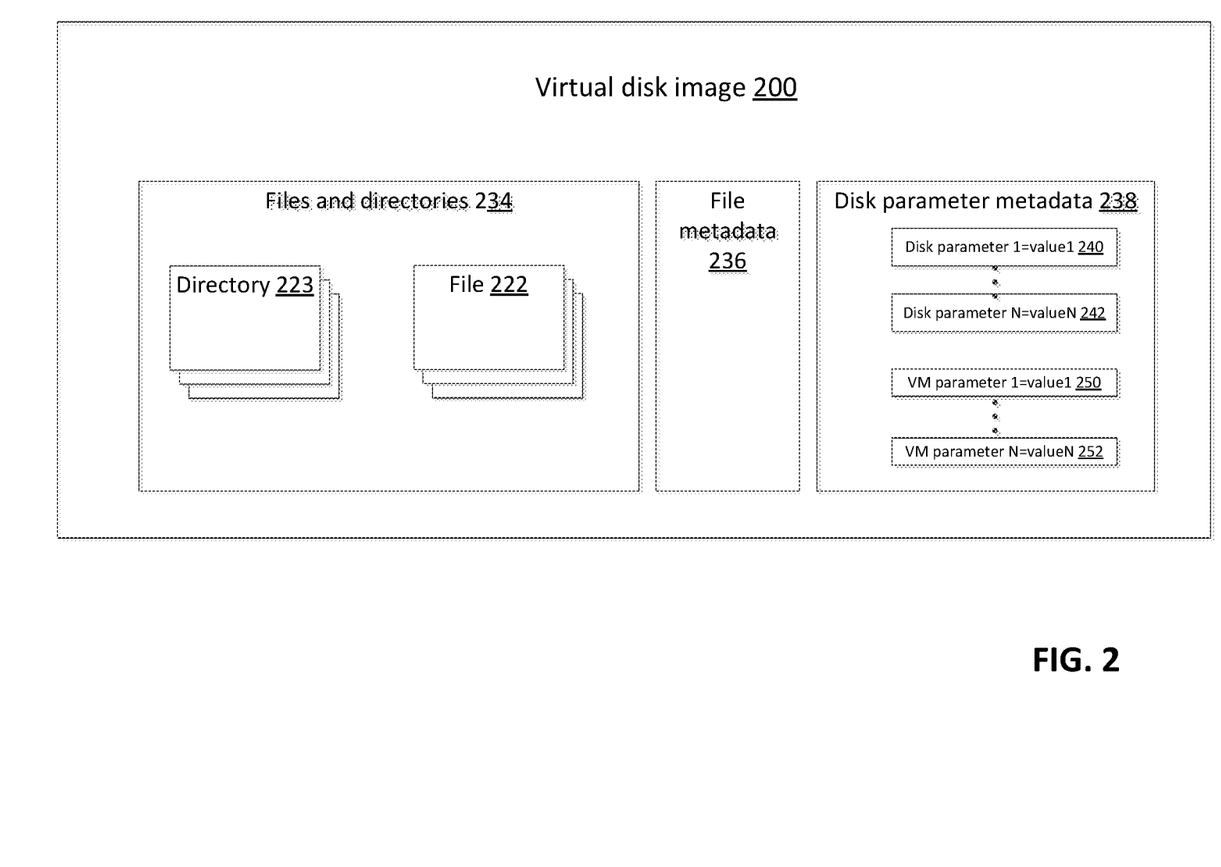
FIG. 2 are block diagram of a virtual disk format according to one embodiment.

FIG. 2 are block diagram of a virtual disk image format according to one embodiment. The virtual disk image 200 may be used for booting VMs, and may contain separate areas for storing, system and application files and directories 234, file metadata 236, and disk parameter metadata 238. Files and directories area 234 may contains one or more files 222 and/or one or more directories 223. In one embodiment, the disk parameter metadata area 238 may simulate the physical disk parameter metadata area, which is commonly utilized for storing physical disk parameter values, such as the number of cylinders, the number of sectors per cylinder, etc. The parameters and their respective values 240 and 242 may be specified as <name=value> pairs.

In implementations of the disclosure, the virtualization manager may repurpose the virtual disk metadata area to enable a flexible boot process of VMs by storing virtual machine configuration information in the virtual disk metadata area 238 of the virtual disk image 200. The virtualization manager may store VM configuration parameters and their respective values. The VM configuration parameters and their respective values 250 and 252 may be specified as <name=value> pairs. The VM configuration parameters to be stored in the virtual disk metadata area 238 may include the type of central processing unit (CPU), the type of a peripheral device (such as a network interface controller or a display controller), the minimum available memory, etc.

Figure 3:
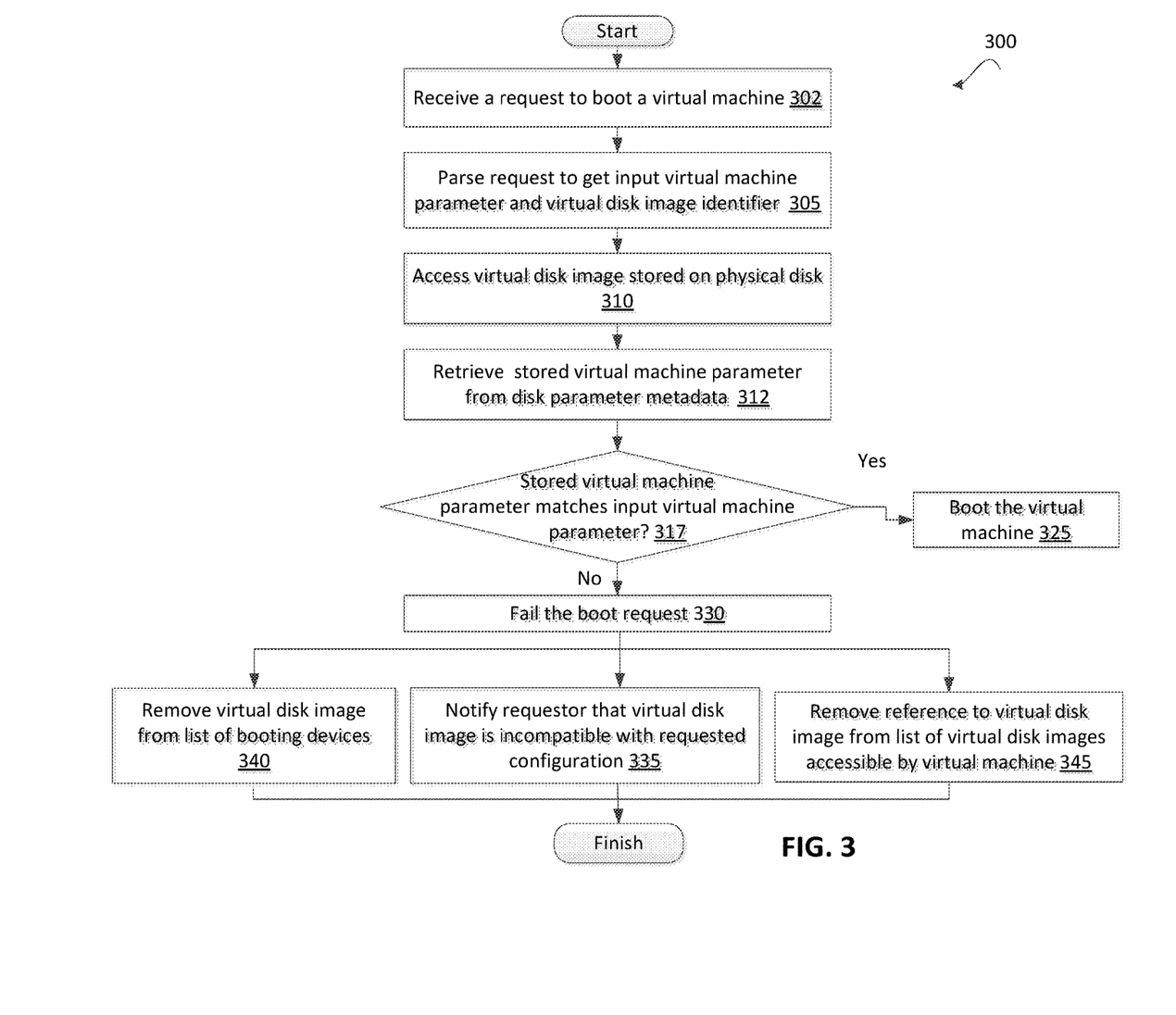
FIG. 3 is a flow diagram illustrating one embodiment for a method of processing a request to boot a virtual machine from a virtual disk image, with a virtual machine parameter input.
Figure 4:
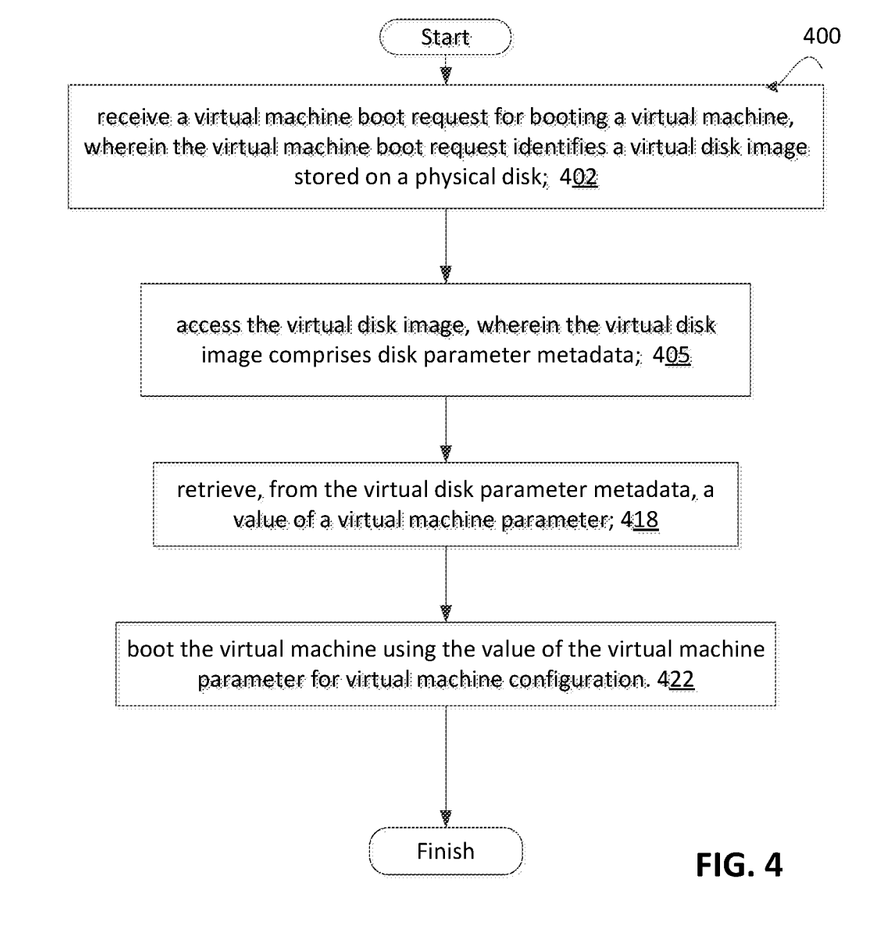
FIG. 4 is a flow diagram illustrating one embodiment for a method of processing a request to boot a virtual machine from a virtual disk image, without an input virtual machine parameter value.

FIGS. 3-4 are flow diagrams of various embodiments of methods related to processing boot requests of VMs from a virtual disk image. The methods are performed by processing logic that may include hardware (circuitry, dedicated logic, etc.), software (such as is run on a general purpose computer system or a dedicated machine), or a combination of both. In one implementation, the methods may be performed by one or more VM boot modules from one or more host machines, referred to herein as processing logic.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. Each method described herein and/or each of its individual functions, routines, subroutines, or operations may be performed by one or more processing devices of the computer system (e.g., host computer system 100 of FIG. 1) implementing the method. In certain implementations, the method may be performed by a single processing thread. Alternatively, the method may be performed by two or more processing threads, each thread executing one or more individual functions, routines, subroutines, or operations of the method. In an illustrative example, the processing threads implementing the method may be synchronized (e.g., using semaphores, critical sections, and/or other thread synchronization mechanisms). Alternatively, the processing threads implementing the method may be executed asynchronously with respect to each other.

FIG. 3 is a flow diagram illustrating one embodiment for a method 300 of processing a virtual disk boot request. At block 302 of method 300, processing logic may receive a request to boot a VM from a virtual disk image. The request may be initiated by a software component (such as a virtualization manager) that determines virtual machines to be booted. The request may identify one or more VM configuration parameter values describing the VM that needs to be booted. The request may also identify the virtual disk image for use as the boot device. The virtual disk image may be stored on a local physical disk of the host system or on an external disk that is connected to the host system via a network.

At blocks 305 and 310, processing logic may parse the request to retrieve the supplied VM configuration parameter values and the virtual disk image identifier. The processing logic then, at block 312, may access the identified virtual disk image and may retrieve, from the virtual disk parameter metadata area, the VM configuration parameter values.

At block 317, processing logic may determine whether each supplied VM configuration parameter value matches the corresponding VM configuration parameter value stored in the disk metadata. In one embodiment, the VM boot module may compare the requested CPU type with the CPU type stored in the disk metadata area. For example, if the requested CPU is x64-based processor and the stored CPU type was x32-based processor, the configuration comparison may result in a mismatch, and at block 330 the boot request may fail. If, on the other hand the values of the two configuration parameters match, the boot request will continue at block 325.

If the processing logic determines that the VM configuration parameter values do not match, the processing logic may fail the boot request and may perform certain remedial operations, illustrated at blocks 335, 340, and 345. In one embodiment, the operations to be performed may be determined based on the nature and severity of the mismatch between the requested and the stored VM configuration parameter values.

At block 335, the processing logic may notify the requestor that the requested configuration does not match the settings of the host system. The notification may be presented to the requestor through a user interface, a log file, or other means of communication. The requestor may independently then decide how to address the mismatch.

At block 340, the processing logic may remove the virtual disk image from a list of booting devices, preventing another boot request for the same VM with the same virtual disk image in the future. In one embodiment, the processing logic may pass the updated list of booting devices back to the requestor.

At block 345, the processing logic may remove the virtual disk image from a list of virtual disk images accessible by the VM. This removal may be accomplished by changing VM configuration file to update the list of virtual disk images accessible by the VM to exclude the virtual disk image from the list. This operation prevents the VM from accessing the virtual disk image, not just for booting but also for any other purpose.

FIG. 4 is a flow diagram illustrating one embodiment for a method 400 of processing a virtual disk boot request that does not provide an input VM configuration parameter value. At block 402 of method 400, processing logic may receive a request to boot a VM from a virtual disk image. The request may be initiated by a software component (e.g., a virtualization manager) that determines virtual machines to be booted. The request may identify the virtual disk image for use as the boot device for the VM, but may supply no VM configuration parameter values. The virtual disk image may be stored on a local physical disk of the host system or on an external disk that is connected to the host system via a network.

At blocks 405 and 418, the processing logic may determine that the VM configurations stored in the virtual disk metadata should be used in processing the booting of the VM. The processing logic then, at block 418, may access the identified virtual disk image and may retrieve, from the virtual disk parameter metadata area, the VM configuration parameter values.

At block 422, the processing logic may execute the boot request using the VM configuration parameter values retrieved from the disk parameter metadata.

Figure 5:
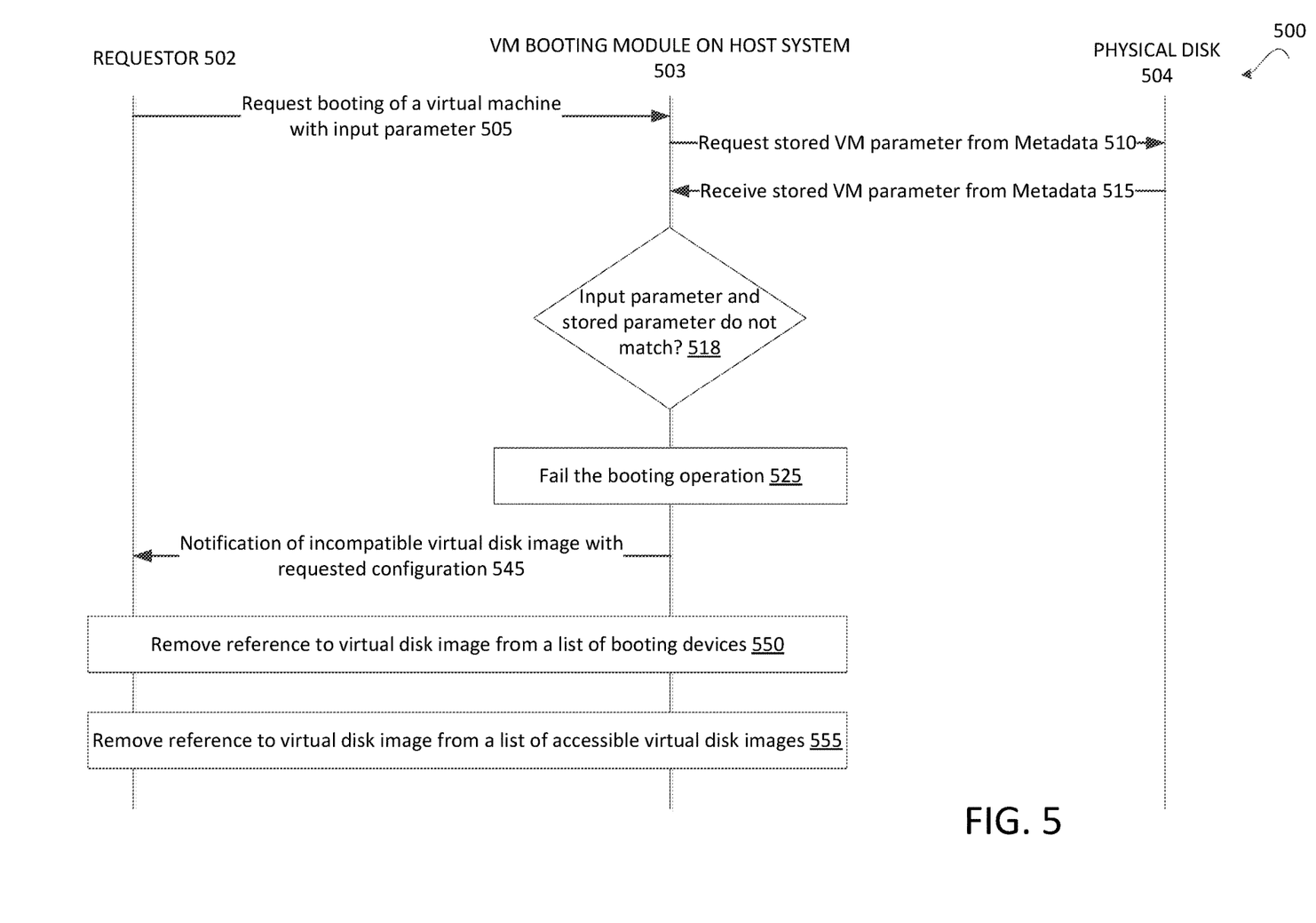
FIG. 5 is a sequence diagram illustrating one embodiment for processing a request to boot a virtual machine from a virtual disk image stored on a physical disk.

FIG. 5 is a sequence diagram illustrating one embodiment for processing a VM boot request from a virtual disk image. The sequence diagram includes a requestor 502, a VM boot module on host system 503, and a physical disk 504. In one embodiment, the physical disk 504 may be a local physical disk within the host system 503 hardware. In one embodiment, the physical disk 504 may be an external disk that is connected to the host system via a network.

At block 505, the host system may receive, from requestor 502, a VM boot request identifying a virtual disk image to be utilized, and supplying one or more VM configuration parameter values. At block 510, the VM boot module 503 may retrieve the VM configuration parameter values. At block 515, the VM boot module 503 may receive the VM configuration parameter values.

At block 518, the VM boot module 503 may determine whether each supplied VM configuration parameter value matches the respective VM configuration parameter value retrieved from the disk metadata stored by the virtual disk image. In one embodiment, the VM boot module may compare the requested CPU type with the CPU type detected and stored by the virtualization manager. For example, if the requested CPU is x64-based processor and the stored CPU type was x32-based processor, the configuration comparison may result in a mismatch.

If the VM boot module determines that the VM configuration parameter values do not match, then at block 525 the VM boot module may fail the boot request and may perform certain remedial operations, illustrated at blocks 545, 550, 555. In one embodiment, the VM boot module may determine the operations to be performed based on the nature and severity of the mismatch. In one embodiment, the VM boot module 503 may notify the requestor 502 that the requested configuration does not match the settings of the host system at block 545. The requestor may then decide how to address the configuration mismatch. In one embodiment, at block 550, the requestor may remove the virtual disk image from a list of booting devices, preventing another boot request for the same VM with the same virtual disk image in the future. In another embodiment, at block 555, the requestor may remove the virtual disk image from a list of virtual disk images accessible by the VM.

At block 550, the VM boot module may remove the virtual disk image from a list of booting devices, preventing another boot request for the same VM with the same virtual disk image in the future.

At block 555, the VM boot module may remove the virtual disk image from a list of virtual disk images accessible by the VM. This operation prevents the VM from accessing the virtual disk image not just for booting, but also for any other purpose.

Figure 6:
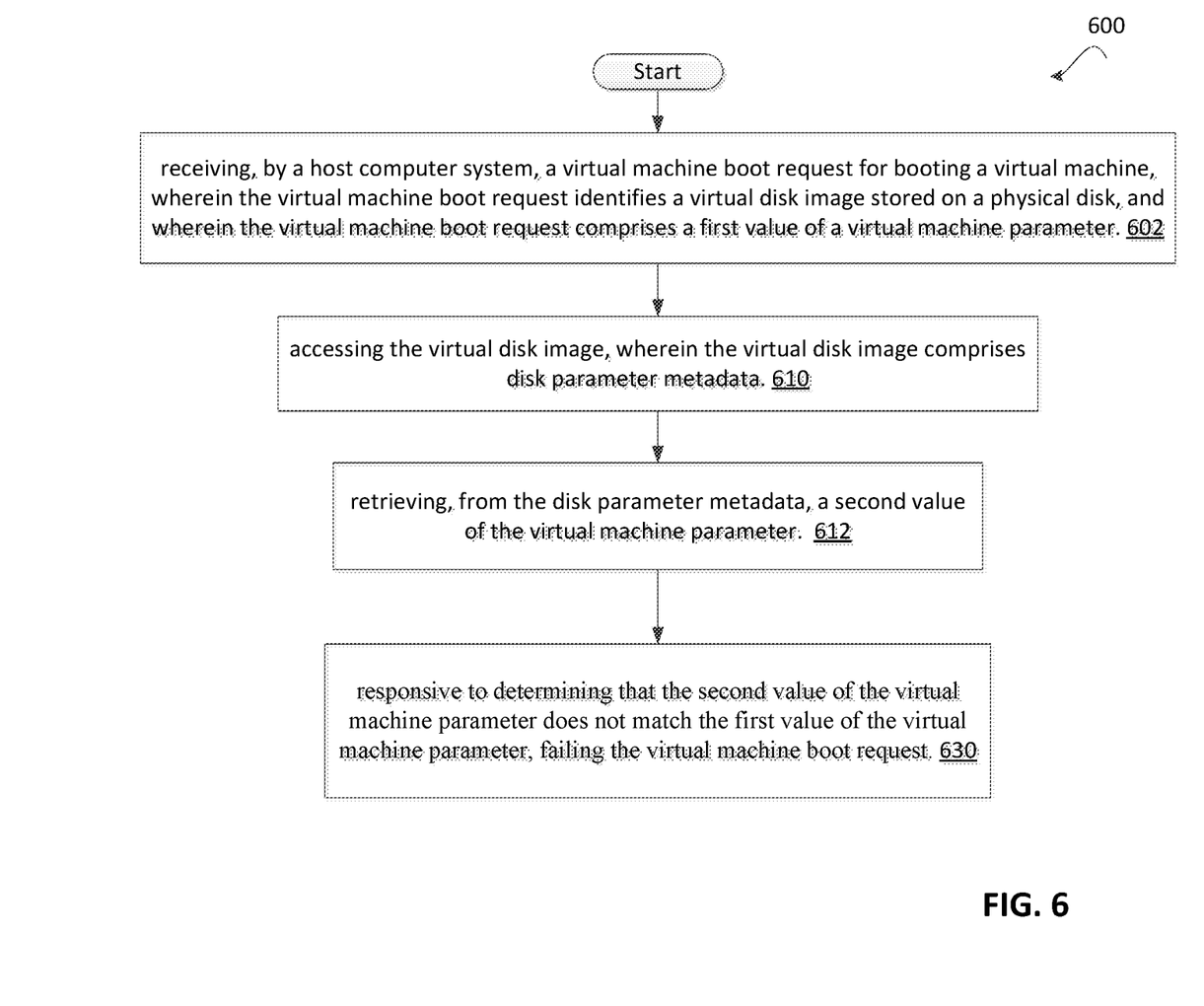
FIG. 6 is a flow diagram illustrating a method of processing a request to boot a virtual machine from a virtual disk image, according to one embodiment.

FIG. 6 is a flow diagram illustrating one embodiment for a method 600 of processing a virtual disk boot request. At block 602 of method 600, processing logic may receive a request to boot a VM from a virtual disk image. The request may be initiated by a software component (e.g., a virtualization manager) that determines virtual machines to be booted. The request may supply one or more configuration parameter values describing the VM that needs to be booted. The request may also identify the virtual disk image for use as the boot device. The virtual disk image may be stored on a local physical disk of the host system or on an external disk that is connected to the host system via a network.

At blocks 610 and 612, the processing logic may access the virtual disk parameter metadata and may retrieve the stored VM configuration parameter values.

At block 630, processing logic may determine whether each VM configuration parameter value supplied by the VM boot request matches the respective VM configuration parameter value stored in the disk metadata. In one embodiment, the VM boot module may compare the requested CPU type with the CPU type detected and stored by the virtualization manager. For example, if the requested CPU is x64-based processor and the stored CPU type was x32-based processor, the configuration comparison may result in a mismatch. The processing logic then may fail the boot request.

Figure 7:
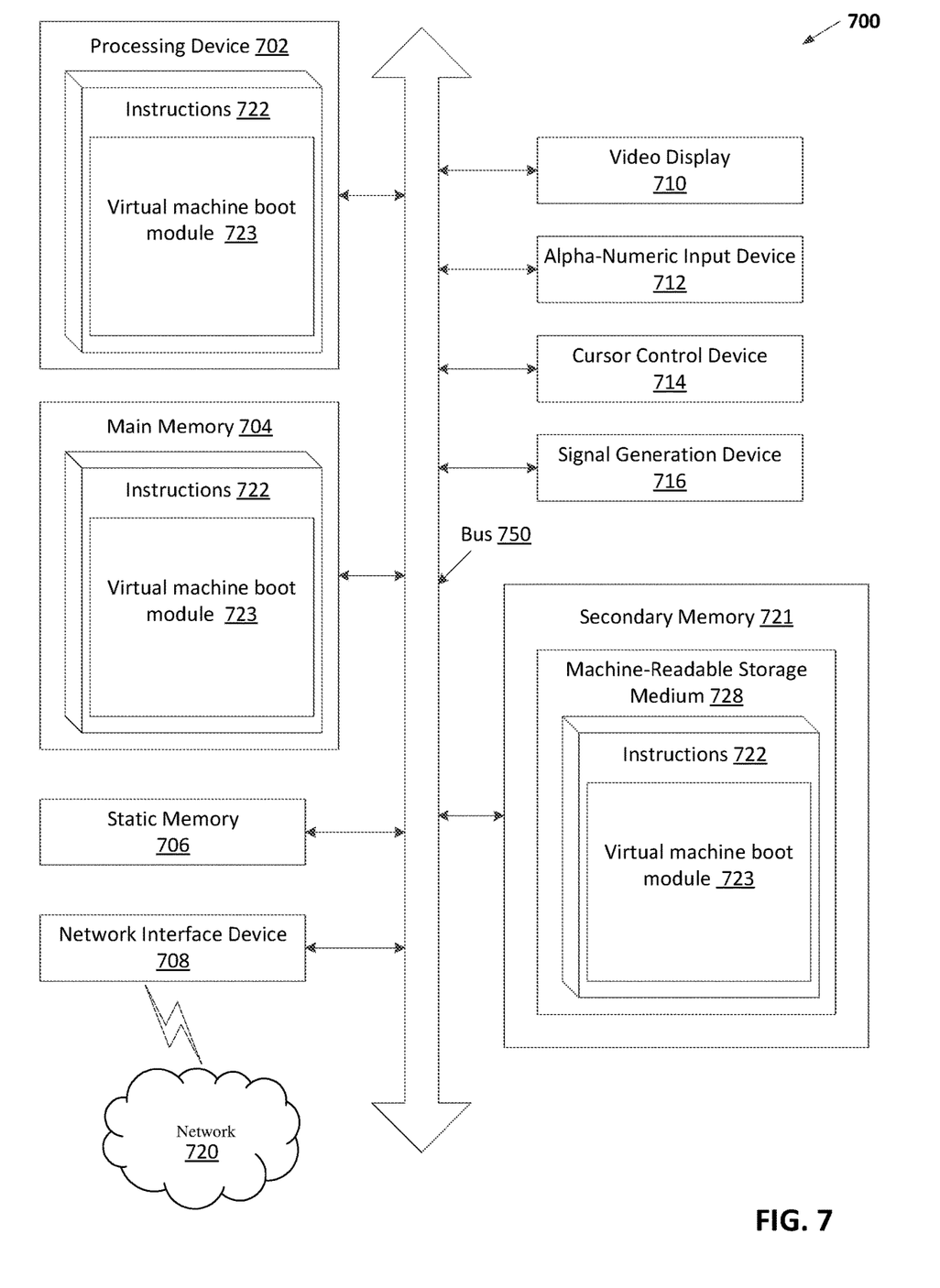
FIG. 7 illustrates a diagrammatic representation of a machine in the exemplary form of a computer system.

FIG. 7 illustrates a diagrammatic representation of a machine in the exemplary form of a computer system 700 within which a set of instructions, for causing the machine to perform any one or more of the methodologies discussed herein, may be executed. The computer system 700 may correspond to a host machine 100 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device), which communicate with each other via a bus 750.

The processing device 702 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 702 may therefore include multiple processors. The processing device 702 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 702 may also be one or more special-purpose processing devices such as an application specific integrated circuit (ASIC), a field programmable gate array (FPGA), a digital signal processor (DSP), network processor, or the like.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The secondary memory 721 may include a machine-readable storage medium (or more specifically a computer-readable storage medium) 728 on which is stored one or more sets of instructions 722 embodying any one or more of the methodologies or functions described herein (e.g., virtual machine booting module 723). The instructions 722 may also reside, completely or at least partially, within the main memory 704 and/or within the processing device 702 during execution thereof by the computer system 700; the main memory 704 and the processing device 702 also constituting machine-readable storage media.

While the computer-readable storage medium 728 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a transitory medium such as a carrier wave that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "generating", "determining", "using", "assigning", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
receiving, by a host computer system, a virtual machine boot request for booting a virtual machine, wherein the virtual machine boot request identifies a virtual disk image stored on a physical disk, and wherein the virtual machine boot request comprises a first value of a virtual machine parameter;

accessing the virtual disk image, wherein the virtual disk image comprises disk parameter metadata;

retrieving, from the disk parameter metadata, a second value of the virtual machine parameter; and responsive to determining that the second value of the virtual machine parameter does not match the first value of the virtual machine parameter, failing the virtual machine boot request.

2. The method of claim 1, wherein failing the boot request further comprises:

notifying a requestor that has initiated the virtual machine boot request of incompatibility of the virtual disk image with a requested virtual machine configuration.

3. The method of claim 1, wherein failing the boot request further comprises:

removing a reference to the virtual disk image from a list of bootable disk images utilized by the host computer system for booting virtual machines.

4. The method of claim 1, wherein failing the boot request further comprises:

removing a reference to the virtual disk image from a list of virtual disk images accessible by the virtual machine.

5. The method of claim 1, wherein the disk parameter metadata comprises a value of a disk parameter.

6. The method of claim 1, further comprising:

responsive to determining that the second value of the virtual machine parameter matches the first value of the virtual machine parameter, booting the virtual machine.

7. The method of claim 1, wherein the virtual machine parameter comprises at least one of: a central processing unit (CPU) identifier, an amount of memory available to the virtual machine, or an identifier of a network in communication with the virtual machine.

8. The method of claim 1 further comprising:

responsive to determining that the second value of the virtual machine parameter matches the first value of the virtual machine parameter, booting the virtual machine using the first value of the virtual machine parameter.

9. A non-transitory computer readable storage medium having instructions that, when executed by a processing device, cause the processing device to:

receive a virtual machine boot request for booting a virtual machine, wherein the virtual machine boot request identifies a virtual disk image stored on a physical disk, and wherein the virtual machine boot request comprises a first value of a virtual machine parameter;

access the virtual disk image, wherein the virtual disk image comprises disk parameter metadata;

retrieve, from the disk parameter metadata, a second value of the virtual machine parameter; and responsive to determining that the second value of the virtual machine parameter does not match the first value of the virtual machine parameter, fail the virtual machine boot request.

10. The non-transitory computer readable storage medium of claim 9, wherein to fail the boot request, the processing device is further to:

notify a requestor that has initiated the virtual machine boot request of incompatibility of the virtual disk image with a requested virtual machine configuration.

11. The non-transitory computer readable storage medium of claim 9, wherein to fail the boot request, the processing device is further to:

remove a reference to the virtual disk image from a list of bootable disk images utilized by the host computer system for booting virtual machines.

12. The non-transitory computer readable storage medium of claim 9, wherein to fail the boot request, the processing device is further to:

remove a reference to the virtual disk image from a list of virtual disk images accessible by the virtual machine.

13. The non-transitory computer readable storage medium of claim 9, wherein the disk parameter metadata comprises a value of a disk parameter.

14. The non-transitory computer readable storage medium of claim 9, wherein the virtual machine parameter comprises at least one of: a central processing unit (CPU) identifier, an amount of memory available to the virtual machine, or an identifier of a network in communication with the virtual machine.

15. A computing device comprising:

a memory; and a processing device coupled to the memory, wherein the processing device is to:

receive a virtual machine boot request for booting a virtual machine, wherein the virtual machine boot request identifies a virtual disk image stored on a physical disk, and wherein the virtual machine boot request comprises a first value of a virtual machine parameter;

access the virtual disk image, wherein the virtual disk image comprises disk parameter metadata;

retrieve, from the disk parameter metadata, a second value of the virtual machine parameter; and responsive to determining that the second value of the virtual machine parameter does not match the first value of the virtual machine parameter, fail the virtual machine boot request.

16. The computing device of claim 15, wherein the processing device is further to:

responsive to determining that the second value of the virtual machine parameter matches the first value of the virtual machine parameter, boot the virtual machine using the first value of the virtual machine parameter.

17. The computing device of claim 16, wherein to boot the virtual machine using the first value of the virtual machine parameter, the processing device is further to: initialize an environment variable using the first value of the virtual machine parameter or store the first value of the virtual machine parameter into a device configuration file.

18. The computing device of claim 15, wherein the disk parameter metadata comprises a value of a disk parameter.

19. The computing device of claim 15, wherein the virtual machine parameter comprises at least one of: a central processing unit (CPU) identifier, an amount of memory available to the virtual machine, or an identifier of a network in communication with the virtual machine.

20. The computing device of claim 15, wherein to fail the boot request, the processing device is further to:

remove a reference to the virtual disk image from a list of virtual disk images accessible by the virtual machine.

* * * * *